United States Patent [19]

Ikeda

[11] Patent Number: 5,930,552
[45] Date of Patent: Jul. 27, 1999

[54] DISPERSED COPYING SYSTEM

[75] Inventor: Masahiro Ikeda, Kanagawa, Japan

[73] Assignee: Fuji Xerox Co., Ltd., Tokyo, Japan

[21] Appl. No.: 08/824,839

[22] Filed: Mar. 26, 1997

Related U.S. Application Data

[63] Continuation of application No. 08/322,475, Oct. 14, 1994, abandoned.

[30] Foreign Application Priority Data

Oct. 27, 1993 [JP] Japan ................................ 5-291398

[51] Int. Cl.$^6$ ..................................................... G03G 15/00
[52] U.S. Cl. ............................................ 399/8; 399/81
[58] Field of Search ...................... 399/81, 82, 8; 364/242.94, 242.95, 242.96; 395/339, 340, 341, 348, 349

[56] References Cited

U.S. PATENT DOCUMENTS

| | | | |
|---|---|---|---|
| 4,899,291 | 2/1990 | Tsukada et al. ......................... | 364/518 |
| 4,999,672 | 3/1991 | Rice, Jr. et al. ......................... | 355/202 |
| 5,010,581 | 4/1991 | Kanno ......................................... | 382/56 |
| 5,060,135 | 10/1991 | Levine et al. ........................ | 364/242.94 |
| 5,113,517 | 5/1992 | Beard et al. ......................... | 364/242.94 |
| 5,179,637 | 1/1993 | Nardozzi ................................. | 395/101 |
| 5,206,735 | 4/1993 | Gauronski et al. ...................... | 358/296 |
| 5,339,168 | 8/1994 | Evanitsky et al. .................. | 355/204 X |
| 5,361,134 | 11/1994 | Hu et al. ............................. | 355/202 X |
| 5,402,527 | 3/1995 | Bigby et al. ............................. | 395/101 |
| 5,564,109 | 10/1996 | Snyder et al. ........................... | 395/828 |

FOREIGN PATENT DOCUMENTS 0 550 191 A3  7/1993  European Pat. Off. .

*Primary Examiner*—Robert Beatty
*Attorney, Agent, or Firm*—Finnegan, Henderson, Farabow, Garrett & Dunner, L.L.P.

[57] ABSTRACT

Original input unit, copy processing content instruction unit, and copy processing execution unit, which respectively function independently of each other, are arranged to be dispersed in a network. The information pertaining to the copy original such as image data is inputted by the original input unit. The contents of the copy processing such as the number of copies, enlargement, reduction, etc. are inputted by the copy processing content instruction unit. When the start button is clicked, the image is read, the instructed contents is generated and the inputted image data and the instructed contents relating to copy processing are transmitted to the copy processing execution unit via the network so as to execute the copy processing in accordance with this information. A displayed device displays a list of documents and a copy device panel window for designing information related to the copy processing simultaneously.

5 Claims, 10 Drawing Sheets

DISPERSED COPYING SYSTEM

This application is a continuation of U.S. application Ser. No. 08/322,475 filed Oct. 14, 1994, now abandoned.

BACKGROUND OF THE INVENTION

1. Field of the Invention

The present invention relates to a dispersed copying system, and more particularly relates to a dispersed copying system the functions of which are arranged to be dispersed in a network.

2. Description of the Related Art

Copiers have been in use for a long time. After then, the various types of OA equipment (office automation equipment) such as word processors, personal computers, and work stations came into use, but copiers remain as the most basic of OA machines.

This is because copiers are the most accessible of OA machines for us. They can be operated by anyone, and are used quite frequently on a daily basis. Furthermore, the contents of the documents represented on paper or film can be subjected to processing such as enlargement or reduction according to necessity to output in a simple manner.

This type of processing can also be performed by other OA machines. For example, work stations and personal computers can also perform enlargement and reduction of image data. In such cases, however, these operations are conducted by linear conversion processing relative to dot data, and their processing mode differs from that of copiers wherein the operations are conducted by manipulation of lens magnification (conventional copiers), or by manipulation of beam scanning speed and drum rotational speed (digital copiers). There are also disparities between the two with regard to the corrective processing accompanying magnification changes, the resolution and contrast of the image which is the object of processing, the processing speed, etc.

In the present specification, all processing performed by these types of copiers are referred to under the general appellation of "copy processing." This copy processing includes not only the essential copy processing—that is, recording of the image onto the medium by the formation of the electrostatic latent image, development, transfer, and fixing—but also processing relating to the image such as enlargement and reduction, processing such as double-sided printing and stapling, and all other processing performed by today's copiers.

A copier roughly has 3 parts. The 3 parts are the part which reads the original image, the part which indicates the contents of the copy processing such as the number of copies, and whether or not there is to be enlargement or reduction, and the part which actually executes the designated copy processing.

Conventionally, these respective parts have been integrated. As a result, one cannot use a copier unless one leaves one's chair and walks over to it, and if one finds another person using it, one has to wait a certain amount of time and again walk over to it. Thus, one cannot use a copier in the manner of other OA machines which allow processing to be conducted from one's seat.

In contrast, in the case of work stations, word processors, and so on, operations can be conducted from one's seat. Yet, as mentioned above, the processing which can be conducted with these machines and its quality are much more limited in comparison with copiers. Furthermore, only the formats prescribed by these machines can be handled, and with regard to this point, they lack flexibility in comparison with copiers which have no such limitations.

Even with regard to the procedures for commanding the various types of processing, operational methods or the like differ according to the device or the application software, one must learn the pertinent operational method of each device, and the convenience of use is poor.

As a result, conventionally, in the case where it is desired to conduct enlargement, reduction, or another type of copy processing with regard to a document or the like prepared by a word processor, it has been common to print it out once, and bring it to a copier to obtain the desired form.

SUMMARY OF THE INVENTION

An object of the present invention is to provide a copying system which eliminates these types of conventional problems, which enables the execution of copy processing from one's seat by the same procedure as the copier operation already established among the users, and which does so not only relative to the paper originals used in conventional copiers, but also relative to the image data stored upon reading these originals, and the document text data prepared by word processors or the like.

The image data which is read from paper originals, and the document text data which is prepared by a word processor or the like are referred to under the general appellation of "electronic original."

A dispersed copying system of the present invention comprises original input unit for inputting information relating to an original which is to be copied; copy processing content instruction unit for designating contents of copy processing relative to the inputted information; and copy processing execution unit for executing the copy processing relative to the inputted information in accordance with the designated contents; wherein the respective units are arranged to be dispersed in a network to function independently of each other, and execute their respective processes while conducting transmittal and receipt of information relating to copy processing via the network.

The original input unit is constituted by, for example, a scanner. This original input unit inputs the information relating to the copy original—for example, image data. The copy processing content instruction unit is constituted, for example, by a copier panel window represented in the display. This copy processing content instruction unit designates the various types of copy processing such as the number of copies, enlargement, reduction, stapling, etc.

When the processing contents is designated, the start button in the window is pressed. By this unit, the inputted image data and the designated contents of the copy processing are supplied to the copy processing execution means via the network.

The copy processing execution unit executes the designated copy processing such as the number of copies, enlargement, reduction, etc. according to the supplied information.

BRIEF DESCRIPTION OF THE DRAWINGS

In the accompanying drawings.

DETAILED DESCRIPTION OF THE PREFERRED EMBODIMENTS

Figure 1:
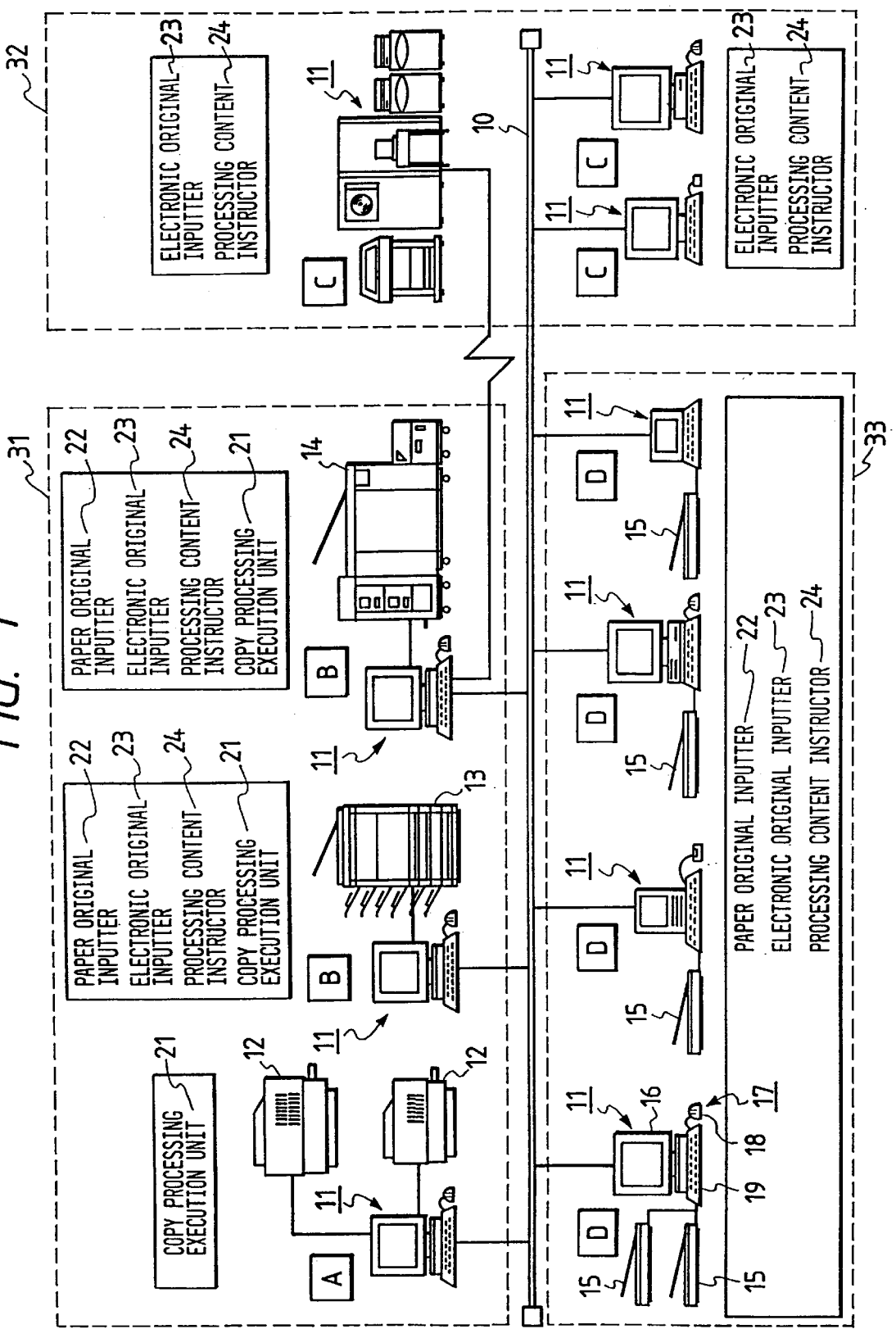
FIG. 1 is a block diagram showing the overall configuration of the embodiment.

The detailed description of the preferred embodiments of the present invention will be described referring with the accompany drawings as follows. FIG. 1 shows the overall configuration thereof. Scanners 15 are arranged in a plurality on a LAN 10 (LAN=Local Area Network).

In the drawing, end systems A to D are respectively arranged to be dispersed on the LAN 10. The end system A is constituted by a computer 11 and two printers 12, and functions as a copy processing execution unit 21. The end system B is constituted by a computer 11 and a copier 13 or a copier 14, and functions as a copy processing execution unit 21. It also functions as a paper original inputter 22, an electronic original inputter 23, and a processing content instructor 24.

The end system C is constituted by a computer 11, and functions as an electronic original inputter 23 and a processing content instructor 24. The end system D is constituted by a computer 11 and a scanner 15, and functions as a paper original inputter 22, an electronic original inputter 23, and a processing content instructor 24. The leftmost exemplar of the end system D is provided with two scanners 15.

All of the end systems are configured so that the computer 11 and the printer 12, and the copier 13, 14, or the scanner 15 are provided in a separated format, but it is also allowed to have a configuration where the computer 11 is incorporated into these respective devices 12 to 15.

Moreover, the end system A and the end systems B share the commonality of being provided with the copy processing execution units 21 respectively (in contrast to the end systems C and D). To make this point readily apparent, those end systems A and B have been enclosed with the broken line 31.

Furthermore, the end system D is provided with both the paper original inputter 22 (scanner 15) and the electronic original inputter 23. In contrast, the end system C is only provided with the electronic original inputter 23. In order to make these points readily apparent, the end system C and D are shown enclosed by the broken lines 32 and 33 respectively.

Figure 2:
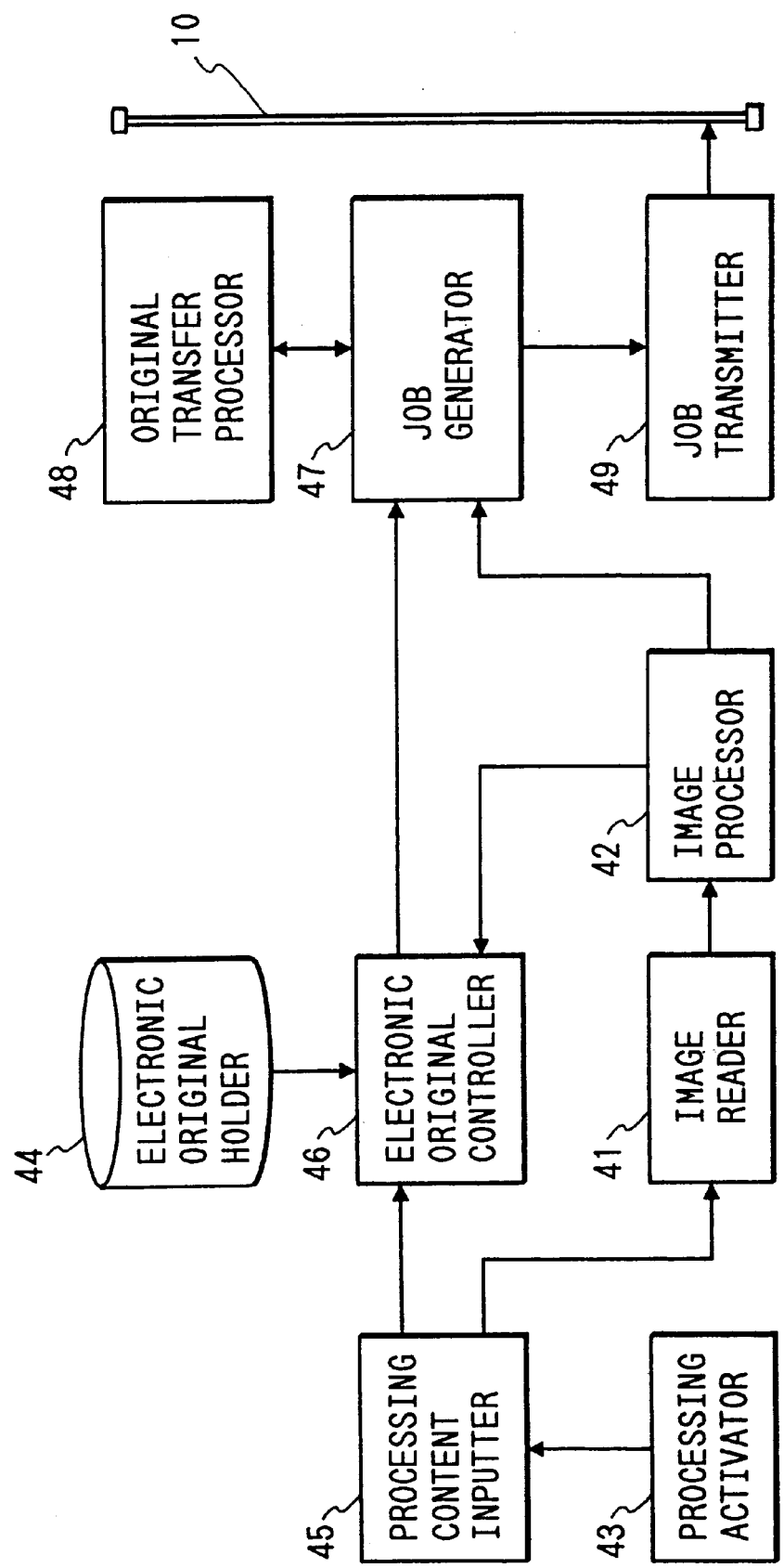
FIG. 2 is a block diagram showing the configuration of the paper original inputter 22, the electronic original inputter 23, and the processing content instructor 24.
Figure 3:
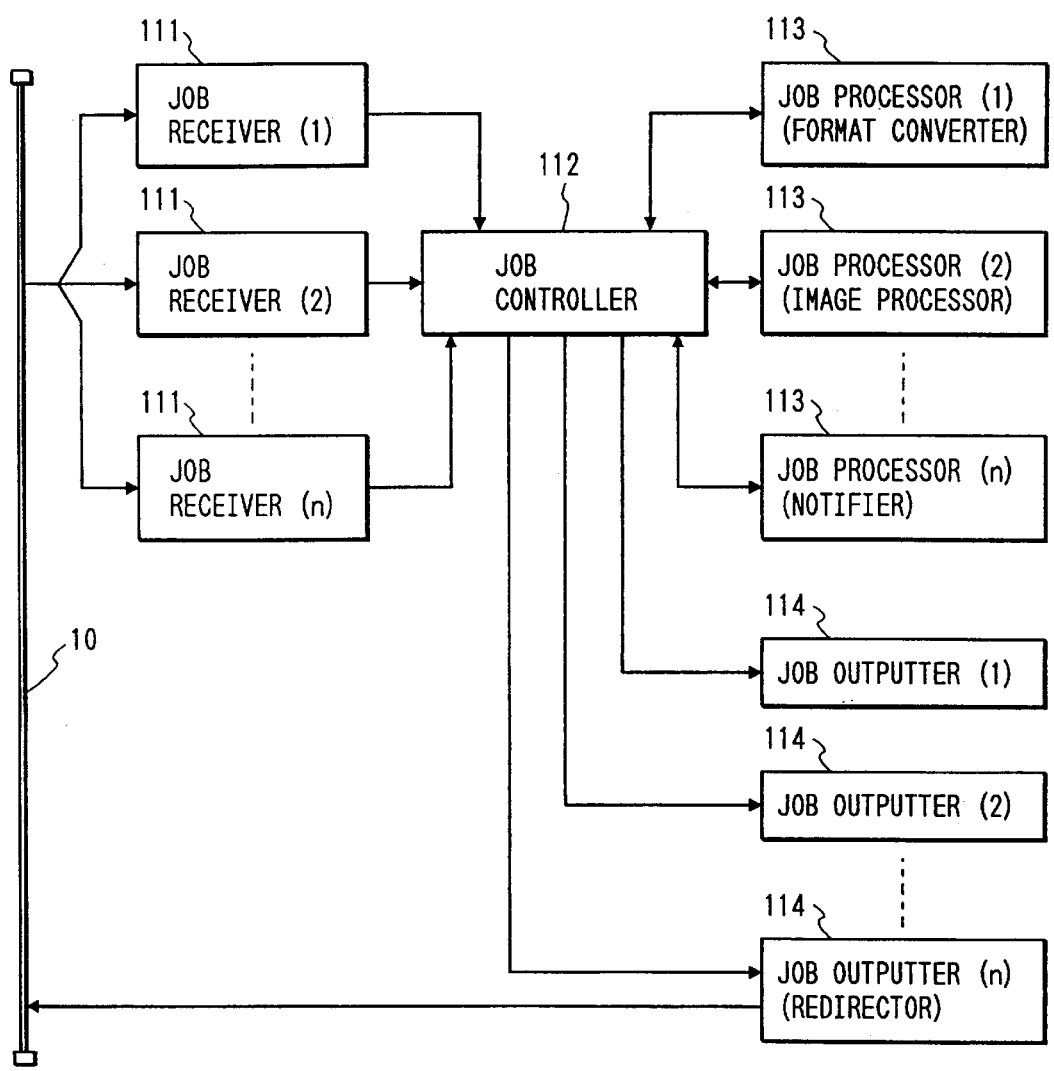
FIG. 3 is a block diagram showing the configuration of a copy processing execution unit 21.

FIG. 2 shows a block diagram of the paper original inputter 22, the electronic original inputter 23, and the processing content instructor 24 which are realized in the end system B or D. FIG. 3 shows a block diagram of the copy processing execution unit 21 which is realized in the end system A or B.

Since all the components (21, 22, 23, and 24) exist in the end system B, each of the blocks shown in both FIG. 2 and FIG. 3 exist here. On the other hand, since only two components (23 and 24) are in the end system C, each of the blocks shown in FIG. 2 except for an image reader unit 41 and an image processor 42 are present here.

Figure 4:
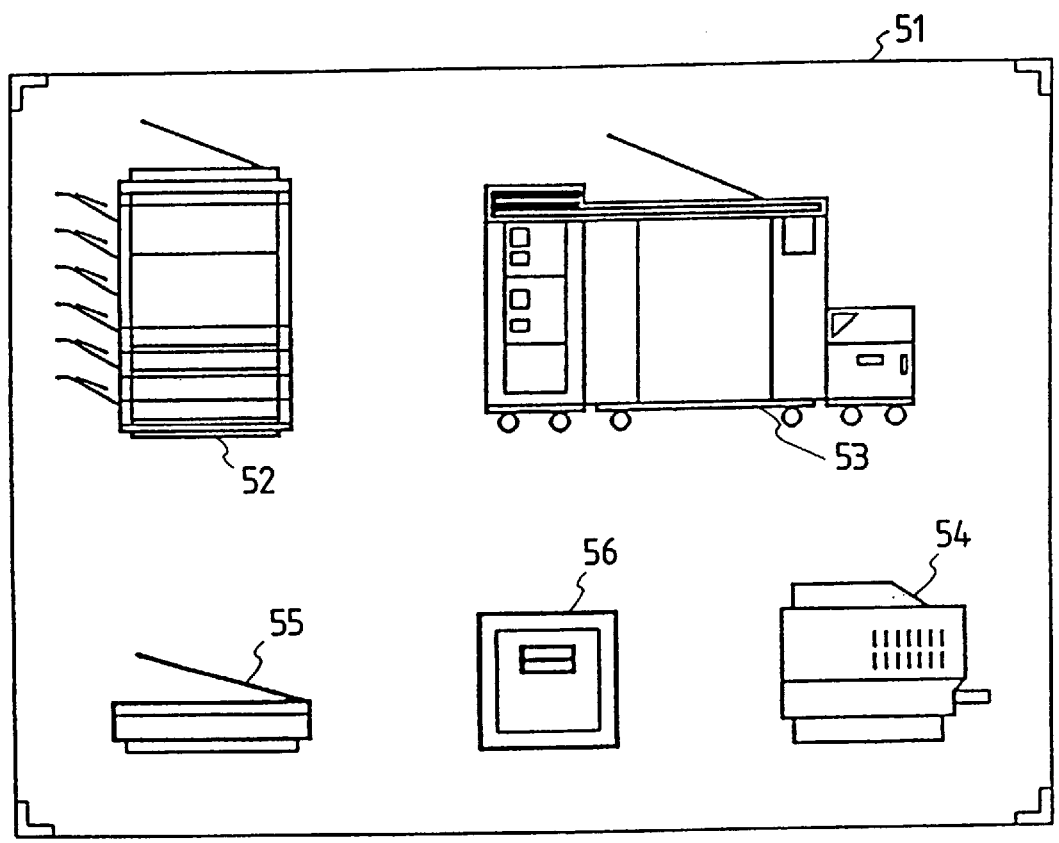
FIG. 4 is a diagram showing the mode selection window displayed at the beginning of processing.

The reference numeral 43 in FIG. 2 represents a processing activator which is provided with a mode selection window 51 shown in FIG. 4. This window 51 is shown on the display 16 of each computer 11, and is provided with icons 52 to 56. The reference numeral of the display 16 is shown only on the leftmost exemplar of the system D of FIG. 1 (since the drawing would otherwise become difficult to view).

The icon 52 of the mode selection window 51 represents the copier 13 of FIG. 1. Similarly, the icons 53 to 56 respectively represent the copier 14, printer 12, scanner 15, and electronic original holder 44. This electronic original holder 44 is realized by the external storage device (not illustrated) of each computer 11, and retains the file of the said electronic original.

To facilitate reading, each icon is referred to with the name of the device which it represents (for example, the icon 55 is the "scanner icon 55").

The processing activator 43 detects the user's operation to the respective icons, supplies the information relating to the operational contents to a processing content inputter 45, and activates the processing content inputter 45.

Figure 5:
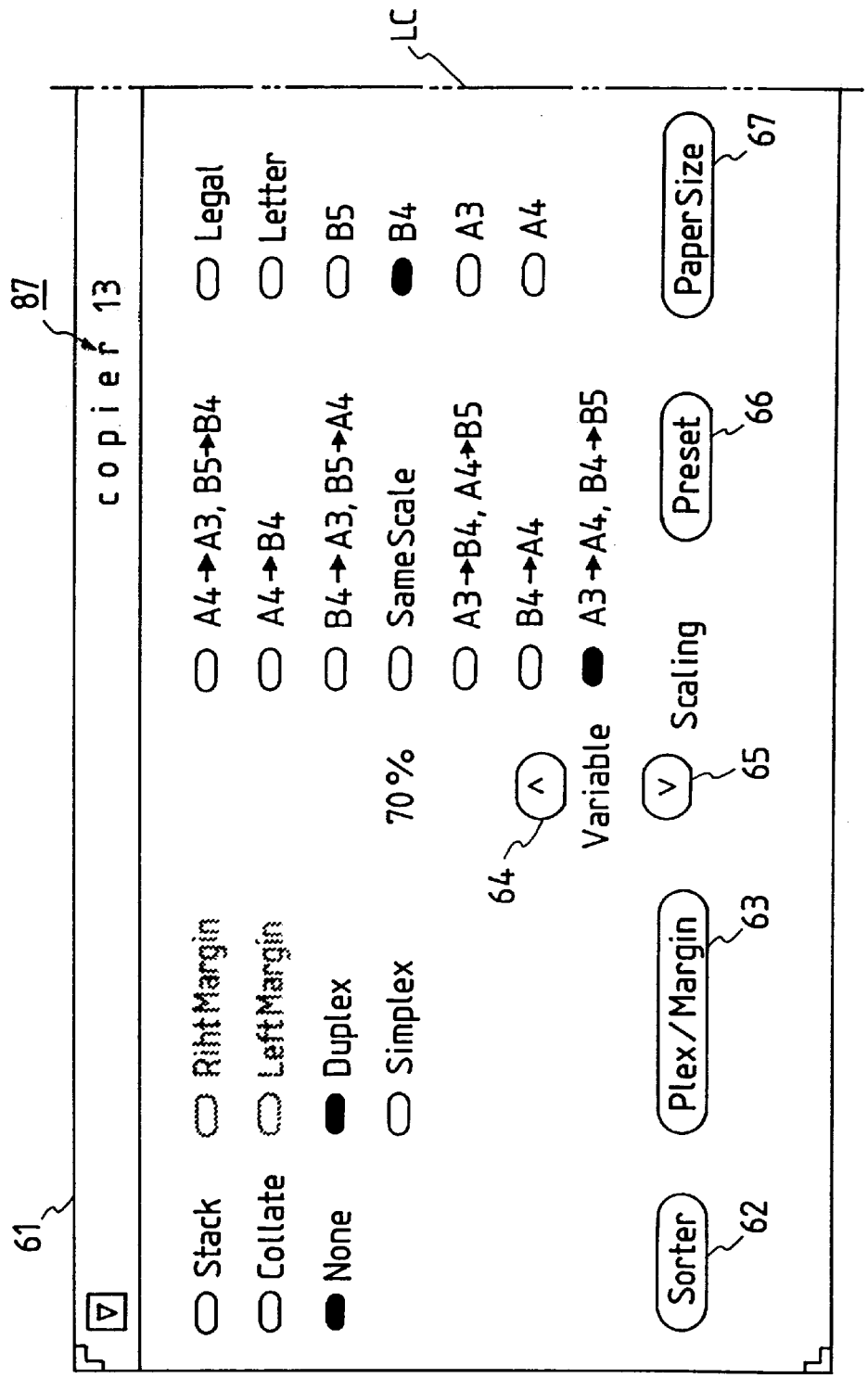
FIG. 5 is a diagram (part 1) showing the copier panel window designed for copy processing content selection.
Figure 6:
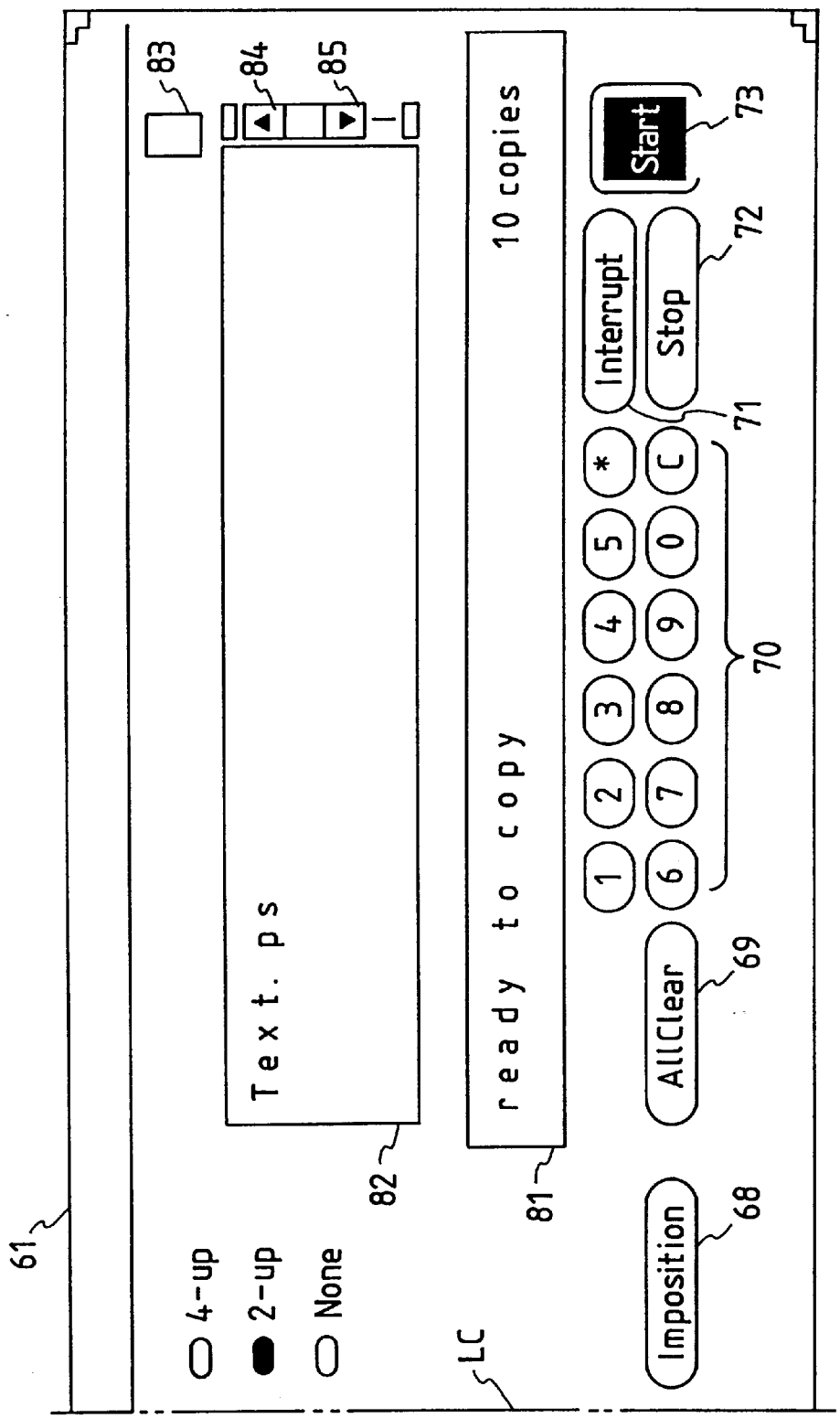
FIG. 6 is a diagram (part 2) showing the copier panel window designed for copy processing content selection.

The processing content inputter 45 is provided with a copier panel window 61 shown in FIG. 5 and FIG. 6 (FIG. 5 and FIG. 6 are connected at the double-dotted broken line LC).

This copier panel window 61 is represented on the display 16 of each computer 11, and is provided with the various illustrated types of buttons and displays. That is, the reference numerals 62 to 68 designate the selection buttons of the copy processing contents, and are identical to those provided in conventional copiers. By placing the cursor (not illustrated) on the respective button and clicking a button 18 of a mouse 17, one can select the copy processing contents.

Since the illustration would otherwise become difficult to view, the reference numerals 17 and 18 pertaining to this mouse and button are only displayed on the leftmost end system D of FIG. 1.

The copy processing items which can be operated by the buttons 62 to 68 are displayed corresponding to each button (since the illustration would otherwise become difficult to view, the use of the reference numerals in this display is omitted; since the items are identical to those of conventional copiers, it is considered that they can be easily understood from the illustration).

The contents of these copy processes are already widely known. Since an explanation of them would be tedious, it is here omitted.

A default value (default state) is prescribed for each of the copy processing items. These default values are stored in the copy parameters table (not illustrated); in the initial state, these default values are displayed as the current values.

In the case where the button is clicked, the newly selected value (state) is written over the pertinent default value in the copy parameters table, and this is displayed as the new current value.

The reference numerals 69 to 73 represent also operational buttons which are similarly manipulated by the mouse 17. Since these are also already widely known, an explanation of them is here omitted. The reference numeral 81 represents a device status display. As in conventional copiers, it displays whether or not copying is possible, the number of copies, and the content of errors.

The reference numeral 82 represents an electronic original display; the file name of the electronic original which is selected by the user as the object of copy processing is displayed here. In the case where there exist several selected electronic originals, one can confirm all the file names by scrolling the display with buttons 84 and 85.

The reference numeral 87 represents a processing execution name display. It displays the name of the copy processing execution units 12 to 14 at the time of selection. In the drawing, the copier 13 is selected, and this is illustrated with the name "copier 13."

Now return to the explanation of FIG. 2. The reference numeral 46 represents an electronic original controller which stores the image data read by the scanner 15 in the electronic original holder 44, and conducts read-out of it. As user interface, the electronic original controller 46 is provided with an image storage window 91 and an electronic original selection window 101 shown in FIG. 7 and FIG. 8, and an electronic original selection button 83 of FIG. 6.

Figure 7:
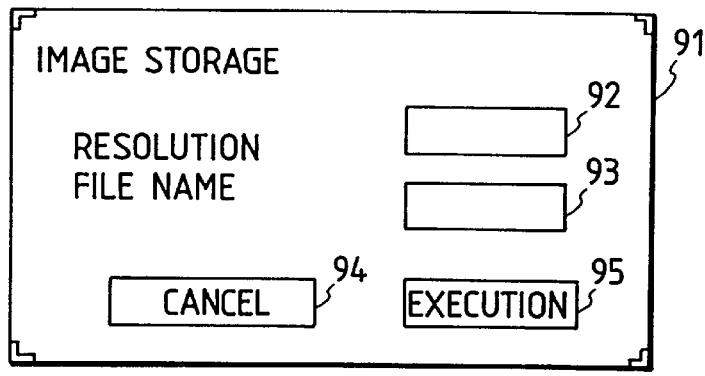
FIG. 7 is a diagram showing the window designed for image storage.
Figure 8:
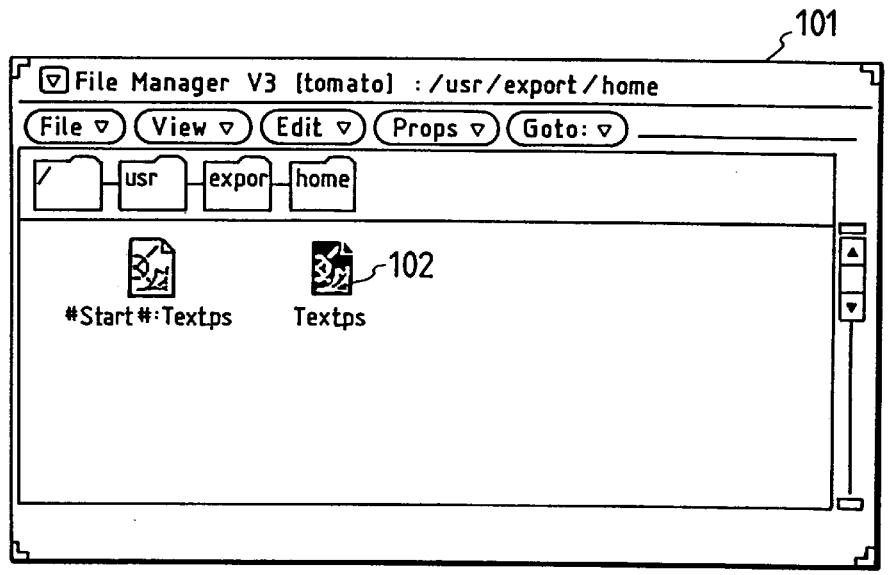
FIG. 8 is a diagram showing the window display designed for selection of the electronic original which is to undergo copy processing.

The image storage window 91 of FIG. 7 is used when storing the image data as an electronic original file in the electronic original holder 44. The electronic original selection window 101 of FIG. 8 is used for viewing, retrieval and read-out of these stored electronic original files.

The electronic original selection button 83 of FIG. 6 is used for selecting the electronic original to undergo copy processing from among the electronic originals displayed in the electronic original selection window 101.

Specifically, this operation involves "placing the cursor on the icon (for example, 102) of the pertinent electronic file, pressing down on the mouse button 18, moving the cursor onto the electronic original selection button 83, and releasing the mouse button 18."

By this means, the electronic original which is to undergo copy processing is selected from among those displayed in the electronic original selection window 101.

The image reader 41 is constituted by the scanner 15 and its driver, and reads the image of the paper original placed on the scanner 15. The image processor 42 performs the predetermined image processing such as noise removal and data compression relative to this image data. This processed image data is supplied to the electronic original controller 46 when preserving it as an electronic original, and is supplied to the job generator 47 when subjecting it to copy processing.

When this data is supplied from the image processor 42 or the electronic original controller 46, the job generator 47 supplies it to the original transfer processor 48. With regard to this data, the original transfer processor 48 conducts processing such as data compression, efficiently executes data transfer, and returns it to the job generator 47.

The job generator 47 combines this data with the copy processing contents inputted via the processing content inputter 45 to generates the job which is supplied it to the job transmitter 49. The job transmitter 49 supplies this job to the designated copy processing execution unit 21 via the LAN 10.

Next, the configuration of the copy processing execution unit 21 shown in FIG. 3 is explained. The reference numeral 111 represents a job receiver which receives the job transmitted from the job transmitter 49 of the respective end system to normalize it so that the job is supplied to a job controller 112.

Figure 9:
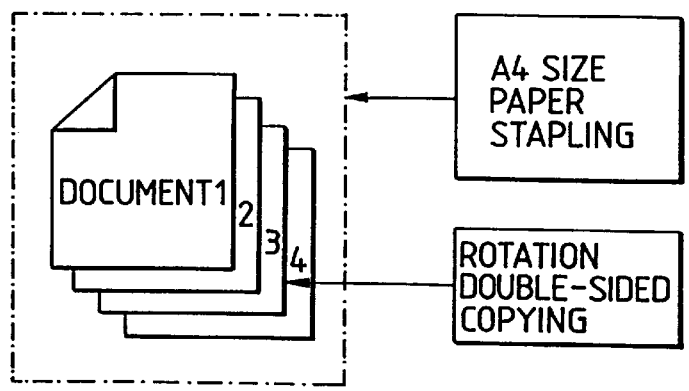
FIG. 9 is a diagram showing an example of a normalized job.

Normalization refers to unifying the diverse formats of the jobs which are sent with the job format prescribed by the pertinent copy processing execution unit 21. FIG. 9 shows an example of this. This unified format includes the data region corresponding to the plurality of documents constituting the original, and the data region corresponding to the instructions for copy processing to be conducted over the entirety of the pertinent original (in the example of FIG. 9, the instructions for use of A4 size paper, and stapling) and the instructions for copy processing effective only for specified documents (in the example of FIG. 9, rotation and double-sided copying). Each job consists of a plurality of documents and each document consists of a plurality of pages.

The job receivers 111 are provided in n quantity (i.e. job receiver 1 to job receiver n), and the job transmitted from the job transmitter 49 of the respective end system is received by the job receiver 111 which is compatible with its job format.

As a result of this type of configuration, since the job generator 47 positioned at the side of each processing content instructor 24 is able to generate to send jobs with the existing job format prescribed in the pertinent end system, this eliminates the need to develop a new system (system flexibility is enhanced).

Next, when the normalized job is transmitted to the job processing controller 112, the job processing controller 112 analyzes the contents of the pertinent job to execute the processing corresponding to the instructed copy processing. It is left to one's discretion to decide which processing is to be made possible.

Here, n quantity of job processors 113 are provided (job processor 1 to job processor n) for the conduct of text format conversion (job processor 1), image processing (job processor 2), notification (job processor n), etc.

The copy object data of the required processing which is executed is supplied to a designated job outputter 114 to be outputted here.

The job outputters 114 are also provided in n quantity (job outputter 1 to job outputter n). These job outputters execute the output of jobs, that is, the designated copy processing, or redirecting.

Redirecting here refers to the case where processing cannot be conducted by the pertinent copy processing execution unit 21, and it is transferred to the copy processing execution unit 21 of another end system.

The job outputter 114 corresponds to the copiers 13 and 14, and the printer 12 of FIG. 1. However, this job outputter 114 may differ for each end system so that, for example, where the end system B is only provided with one each of the copiers 13 and 14, the end system A has two printers 12.

In FIG. 3, the job outputters 114 are provided in n quantity in order to represent this. When a plurality of job outputters 114 are provided as in the end system A, the processing speed is improved, and it is possible to strive for the diversification of copy processing contents.

Figure 10:
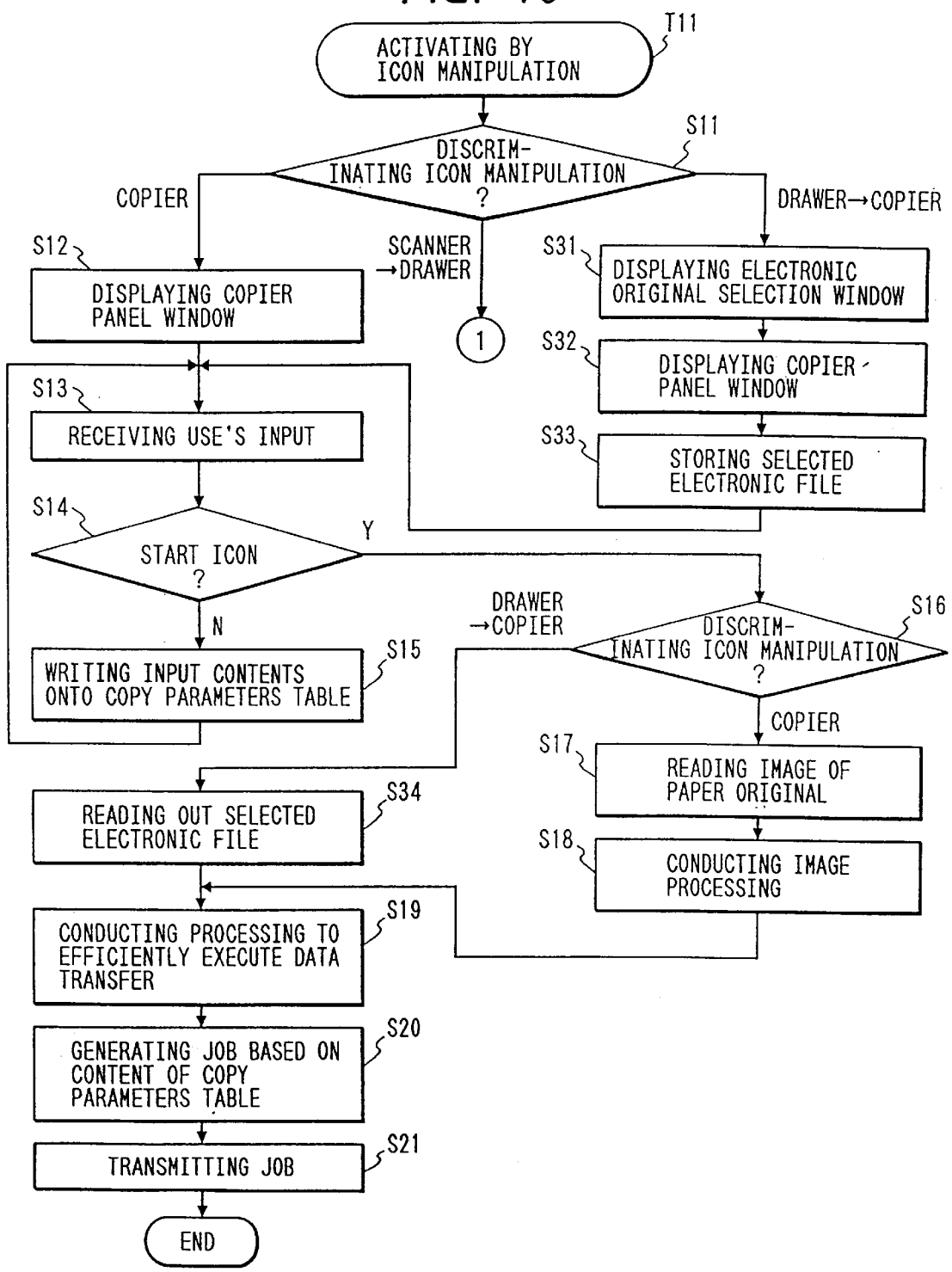
FIG. 10 is a flow chart (part 1) showing the processing sequence for the paper original inputter, the electronic original inputter, and the processing content instructor.
Figure 11:
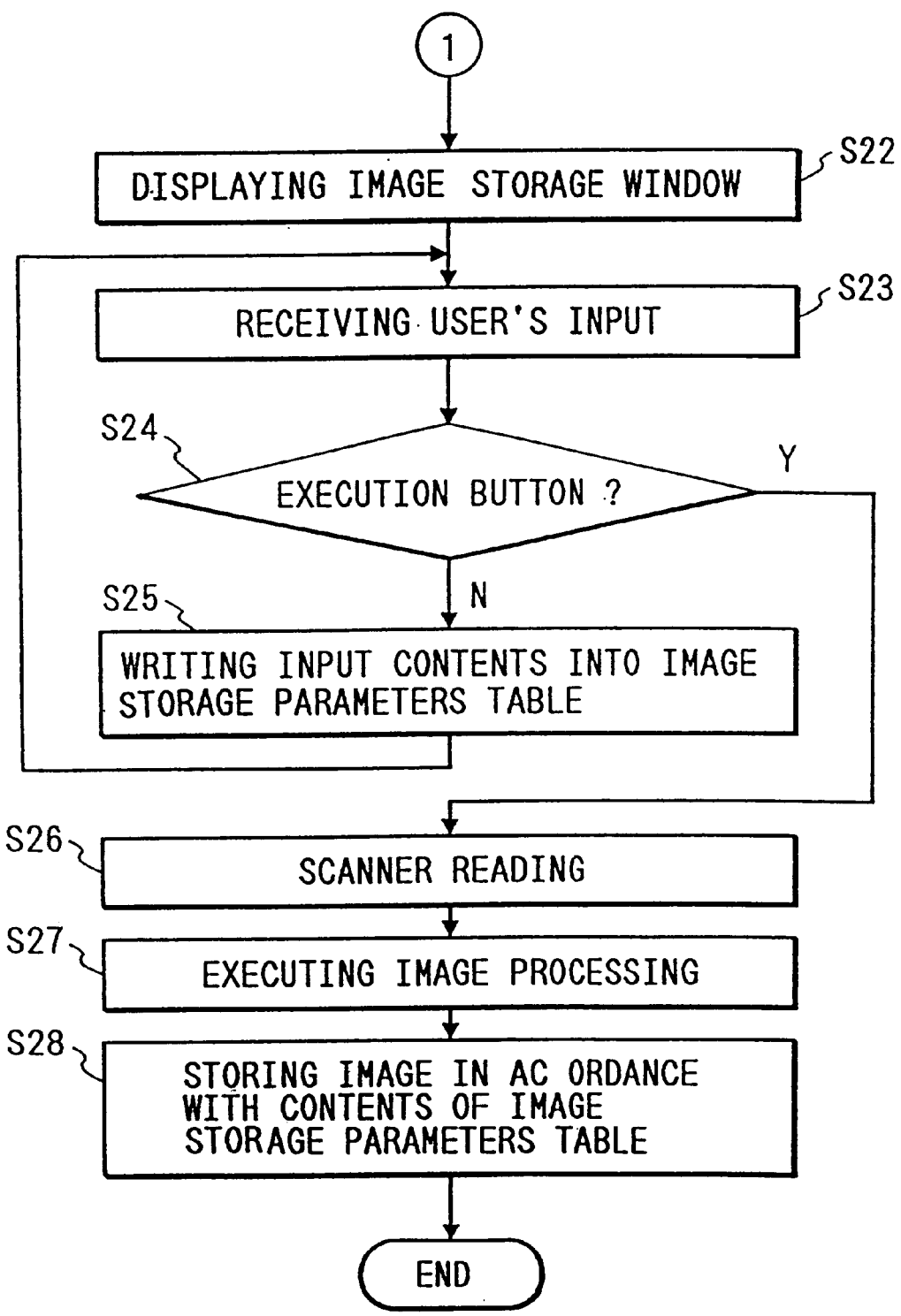
FIG. 11 is a flow chart (part 2) showing the processing sequence for the paper original inputter, the electronic original inputter, and the processing content instructor.
Figure 12:
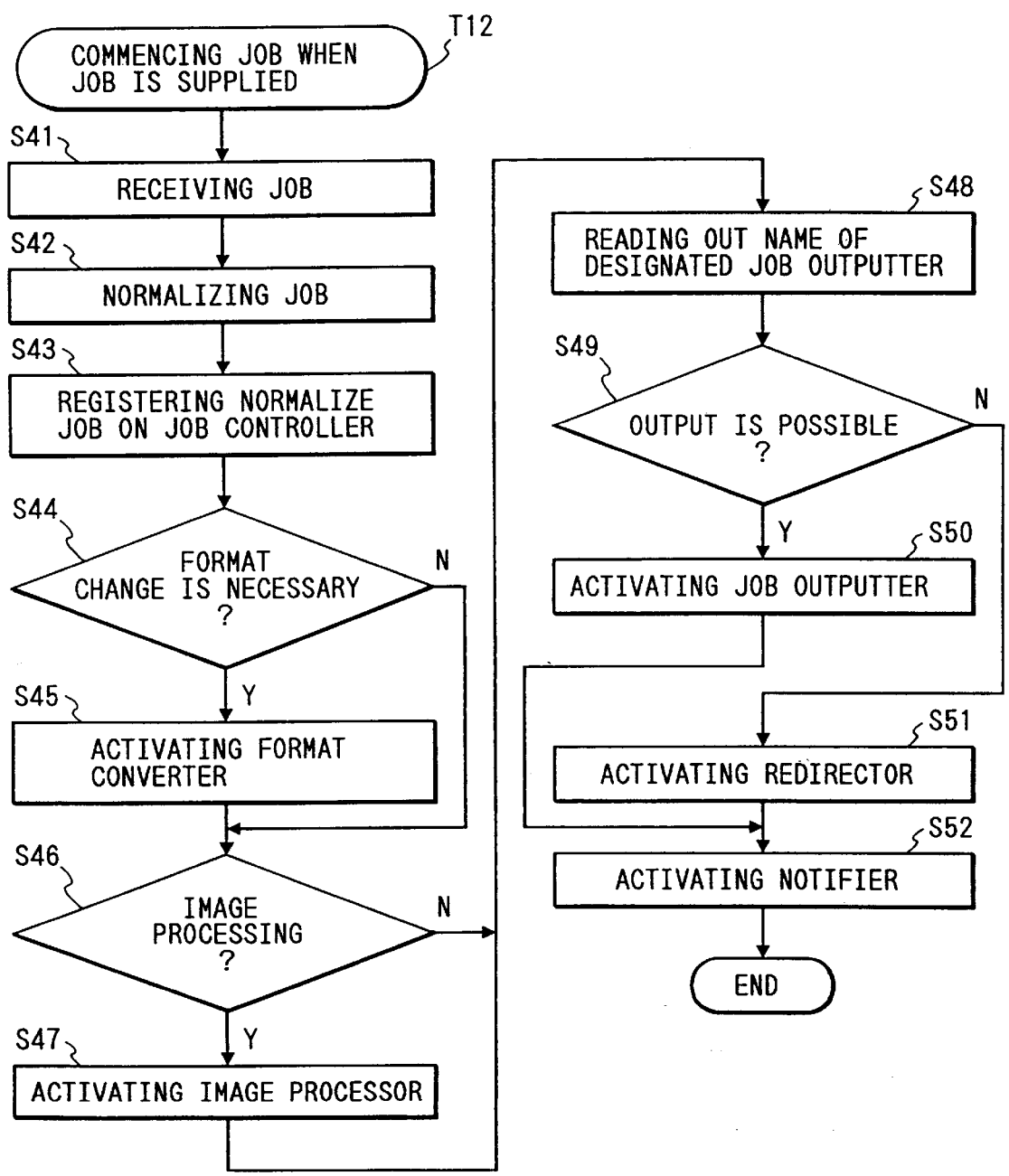
FIG. 12 is a flow chart showing the processing sequence for a copy processing execution unit.

FIG. 10 to FIG. 12 show the processing sequence of each part (a connection terminal (1) of FIG. 10 connects to a connection terminal (1) of FIG. 11). Among these, the flow charts shown in FIG. 10 and FIG. 11 are the processing conducted by each block of FIG. 2, and represent the processing of the paper original inputter 22, the electronic original inputter 23, and the processing content instructor 24.

That is, initially, the mode selection window 51 of FIG. 4 is displayed on the display 16. The user then manipulates one of the below-mentioned icons according to the desired processing contents.

(1) When wishing to copy process a paper original

The paper original which is to undergo copy processing is placed on the scanner 15, and one clicks any one of the icons 52 to 54 representing the desired copy processing execution unit.

Since the icon operation has flexibility, "the case where the scanner icon 55 is manipulated in advance (the case where the scanner icon 55 is dragged and released at any one of the icons 52 to 54 of the desired copy processing execution unit)" is also considered to be the "icon operation in the case where it is desired to conduct copy processing of a paper original."

However, since it would be tedious to state the two operations one after the other, they will be represented in the following explanations by the initial statement "one clicks any one of the icons 52 to 54 representing the desired copy processing execution unit."

With regard to the placement of the paper original, any time is acceptable so long as it is before the clicking of the start button 73 of FIG. 6.

(2) When wishing to preserve a paper original as an electronic original

The paper original which is to undergo copy processing is placed on the scanner 15, and one conducts drag-and-release of the scanner icon 55 at the drawer icon 56.

In this case, as well, the placement of the paper original may be done at any time before the clicking of the execution button 95 of FIG. 7.

(3) When wishing to copy process an electronic original

One conducts drag-and-release of the drawer icon 56 at any one of the icons 52 to 54 of the desired copy processing execution unit.

The processing activator 43 detects the contents of these icon manipulations, which transmits the name of the clicked icon, or dragged and released, to the processing content inputter 45 so as to activate the pertinent processing content inputter 45 (terminal T11 of FIG. 10).

The processing content inputter 45 discriminates the contents of the transmitted icon manipulation (step S11) to respectively conduct the corresponding processing. The words "terminal" and "step" are hereafter omitted.

First, when the content of the icon manipulation is the aforementioned (1) (copy processing of a paper original), the processing content inputter 45 displays the copier panel window 61 shown in FIG. 5 and FIG. 6 (S12). Moreover, the processing execution name display 87 displays the name of the copier 13 selected by the user on this occasion—for example "copier 13."

With regard to each copy processing item, its default value is set in the copy parameters table as mentioned above, and the initial display of the copier panel window 61 displays this default value as the current selection state.

When wishing to change this state, one clicks the respective button 62 to 70 to select the desired copy processing content.

When these buttons are clicked—that is, when there is a user input—the processing content inputter 45 receives this input (S13). If it is not the start button which was clicked, then there is a change in the copy processing contents (S14 "N (no)").

The processing content inputter 45 writes the contents set by the user on this occasion (the set value) onto the copy parameters table (S15).

When the setting, or the confirmation (when the value of the initial setting is okay), of the copy processing contents has ended, the start button 73 is clicked.

Since the start icon is used at this time (S14 "Y"), the processing content inputter 45 instructs the image reader 41 to conduct image reading of the paper original by the scanner 15 in accordance with the icon operational contents of this occasion (S16 "copier"→S17).

The image data which is read is sent to the image processor 42. The image processor 42 conducts the necessary image processing such as noise removal (S18), and sends this data to the job generator 47.

The job generator 47 transmits this to the original transfer processor 48. With regard to this data, the original transfer processor conducts processing such as data compression, efficiently executes data transfer, and returns it to the job generator 47 (S19).

The job generator 47 combines this data with the copy processing contents retained in the copy parameters table at this time (set by the user) to generate the job (S20). The generated job is sent to the job transmitter 49 to be transmitted to the designated copy processing execution unit 21 of end system A or B (S21).

When the job is supplied, the copy processing execution unit 21 commences the processing shown in FIG. 12 (T12). The supplied job is received by the job receiver 111 which is compatible with its format (S41) so as to be normalized it (S42, FIG. 9).

The normalized job is registered on the job controller 112 (S43). The job controller 112 sequentially extracts this job and analyzes its contents. If format changes, image processing, etc. are necessary, the designated processing is executed using the respective job processors 113 (S44 to S47).

With regard to the question of what type of processing is to be made possible, this is left to one's discretion. Here, the aforementioned format conversion and image processing are made possible (However, this format conversion processing and image processing is applied to text files prepared by ordinary word processing devices. This processing cannot be conducted with the "paper original copying" which is adopted here.).

After the required processing is conducted, the job controller 111 reads out the name of the designated job outputter 114 (S48). This is the directly connected job outputter (copier 12, 14, etc.). If output is possible at that time (S49 "Y"), the pertinent job outputter 114 is activated to execute the designated copy processing (S50).

On the other hand, in the case where copy processing cannot be executed by the copy processing execution unit 21 because the designated job outputter 114 is inactive, etc., the redirector (114) is activated so that transfer is conducted to another copy processing execution unit 21 which is capable of job processing at this time (S51).

After the end of the processing, the notifier (114) is activated so that the results of the copy processing—such as "copy processing completed" or "transferred to another copy processing execution unit 21"—are reported to the user who requested the copy processing of this occasion (S52).

Next, explanation will be made on processing in the case of the aforementioned (2) "preserving a paper original as an electronic original."In this case, the paper original which one wishes to copy is placed on the scanner 15 so that the scanner icon 55 is dragged and released at the drawer icon 56.

The processing activator 43 detects the contents of these icon manipulations, and transmits the name of the icon which is clicked, or which is dragged and released, to the processing content inputter 45 in the same way as the aforementioned (1) "when wishing to copy an ordinary paper original." It then activates the pertinent processing content inputter 45 (terminal T11).

Here, since "the scanner icon 55 is dragged and released at the drawer icon 56.", the processing content inputter 45 first displays the image storage window 91 of FIG. 7 on the display 16 (FIG. 10 S11→FIG. 11 S22 ).

When the image storage window 91 is displayed, the user inputs the resolution of the image reading (for example, 400 DPI) and the file name of the electronic original using the keyboard 19 of FIG. 1 (the code number of the keyboard is only shown at the leftmost exemplar of end system D).

The processing content inputter 45 receives this user input (S23) to write its contents into the image storage parameters table (not illustrated) (S24 "N"→S25).

The image storage parameters signify all the parameters when storing the image data of the paper original as an electronic original in the electronic original holder 44, and these values are retained in the image storage parameters table.

The resolution 92 and file name 93 shown in FIG. 7 are examples of these parameters, but one may also set the title of the paper original, and other optional items for each system.

After the inputting of the parameters is ended, one clicks the execution button 95. When wishing to cancel the processing, one clicks the cancel button 94.

When the execution button 95 is clicked, the processing content inputter 45 instructs the image reader 41 to conduct image reading of the pertinent paper original in the same way as the aforementioned (1) "when wishing to copy a paper original" (S26).

In conjunction with this, the image reader 41 conducts scanner reading (S26), and the image processor 42 executes image processing (S27). This processing of S26 and S27 is identical to that of S17 and S18 of FIG. 10.

The processed data is transmitted to the electronic original controller 46. The electronic original controller 46 stores this image data in the electronic original holder 44 in accordance with the contents of the image storage parameters table (S28).

Next, explanation will be made on the processing sequence of the aforementioned (3) "when wishing to copy process an electronic original." In this case, as mentioned above, the drawer icon 56 is dragged and released at any one of the icons 52 to 54 of the desired copy processing unit.

The processing activator 43 detects the contents of this icon manipulation to activate the processing content inputter 45 (T11). In conjunction with this, the processing content inputter 45 displays the electronic original selection window 101 of FIG. 8 and the copier panel window 61 of FIG. 5 and FIG. 6 on the display 16 (S31 and S32 of FIG. 10).

The file name of the electronic original stored in the electronic original holder 44 is displayed on this electronic original selection window 101.

As mentioned above, not only material consisting of image data, but also ordinary text files described by page description language and other formats are included in the file of the electronic original. In the present specification, the hard copy output of this type of text file is treated as copy processing.

The user manipulates the mouse 17 to select the file to undergo copy processing from among the file names displayed in the electronic original selection window 101. Specifically, one drags and releases the icon of the electronic original which one wishes to copy process—for example, the icon of code number 102—at the electronic original selection button 83 of the copier panel window 61. In the case where a plurality of electronic originals are selected, this operation is repeated. In this way, the file names of the selected electronic files are stored in the processing content inputter 45 (S33).

After here, the same processing is conducted as in the aforementioned (1) "the case where an ordinary paper original is to be copied." However, the icon operation of this occasion is "drawer→copier."

Accordingly, one advances from S16 to S34, and the electronic original file of the name selected and stored in the S31 to S33 is read out from the electronic original holder 44 by the electronic original controller 46, and this is transmitted as a job (S12 to S21).

As shown in FIG. 1, when a plurality of computers including scanners are arranged to be dispersed in a network or when a plurality of scanners are arranged at one computer, even if one of the original input means constituted by these is in use, original input can be conducted using another open original input means, which consequently has the effect of improving convenience for the user.

This point is also the same in relation to copiers and printers. When a plurality of computers including copiers are arranged to be dispersed in a network or when a plurality of copiers are arranged at one computer, the identical effect is obtained.

The image reading means may be constituted by the reading unit of a fax, a CCD image pickup element, etc.

As explained above, in the present proposed invention, original input means, copy processing content instruction means, and copy processing execution means which respectively function independently are arranged to be dispersed in a network.

In addition, the information pertaining to the original which is to be copied is inputted by the original input means, the content of the processing for this is instructed by the copy processing content instruction means, and the copy processing of the inputted information according to the pertinent instructed contents is executed by the copy processing execution means.

Thus, in contrast to conventional copiers, the input of the copy original, and the operations relating to the copy processing of the instructed processing contents can be conducted without leaving one's seat.

Moreover, the processing contents can be instructed in the same way as in conventional copier operation. Thus, one can conduct copy processing instruction in a very simple manner not only for paper originals, but also for electronic originals.

Furthermore, the conduct of enlargement, reduction, and other copy processing relative to electronic originals, which could not be done easily heretofore, can be easily executed by the dispersed copying system of the present invention.

What is claimed is:

1. A terminal device in a dispersed copying system for designating a remote printer device on a network and for transmitting print job information to the remote printer device, the terminal device comprising:

operating means for inputting control information, including information designating a start of copy processing, information designating a copy mode, and information relating to contents of a copy process;

image displaying means for displaying image information;

image reading means for reading an image from a paper original; and control means for causing said image display means to display a copying device panel window for designating the information relating to contents of a copy process when the copy mode is set by said operating means, and for, when said operating means designates a start of copy processing:

causing said image reading means to read the paper original;

generating print job information including the read image data and the information relating to the contents of a copy process; and transmitting the print job information to the designated printer device for printing.

2. A terminal device according to claim 1, wherein said control means displays an icon of said printer device on said image displaying means, and displays a copying device panel window for designating the information relating to contents of the copy process.

3. A terminal device according to claim 1, wherein said control means displays an icon of said image reading means and an icon of said printer device on said image displaying means, and displays the copying device panel window for designating contents of the copy process when said operating means designates the icon of said image reading means and the icon of said printer device, so that said image reading means of the designated icon reads the original when said operating means designates a start of copy processing.

4. A terminal device in a dispersed copying system for designating a remote printer device on a network and for transmitting print job information to the remote printer device, the terminal device comprising:

operating means for inputting control information, including information relating to contents of a copy process;

image displaying means for displaying image information;

image storing means for storing image information;

control means for causing said image displaying means to display an icon of said image storing means, an icon of said printer device, a document name display window which displays a list of names of documents stored in said image storing means when said icon of said imaging storing means is activated, a copying device panel window for designating the information relating to contents of the copy process when said icon of said printer device is activated, and a name of a document designated by said operating means in said copying device panel window, the document name window and the copying device panel window being displayed simultaneously, and wherein said control means reads out image data corresponding to the document name when said operation means is designated to start copying and said control means transmits the read out image data and the information relating to contents of a copy process as print job information to a designated printer.

5. A terminal device according to claim 4, wherein said control means displays names of a plurality of documents designated by said operating means in said copying device panel window, transmits image data of the plurality of documents with the information relating to contents of a copy process to the designated printer, and causes the designated printer to print the image data of the plurality of documents based on the information relating to the contents of the copy process.

* * * * *